Dec. 4, 1923.

A. A. GIETZELT 1,476,200

RESILIENT WHEEL

Filed Jan. 17, 1922

INVENTOR
ARTHUR A. GIETZELT.
BY
Frank Waterfield.
ATTORNEY

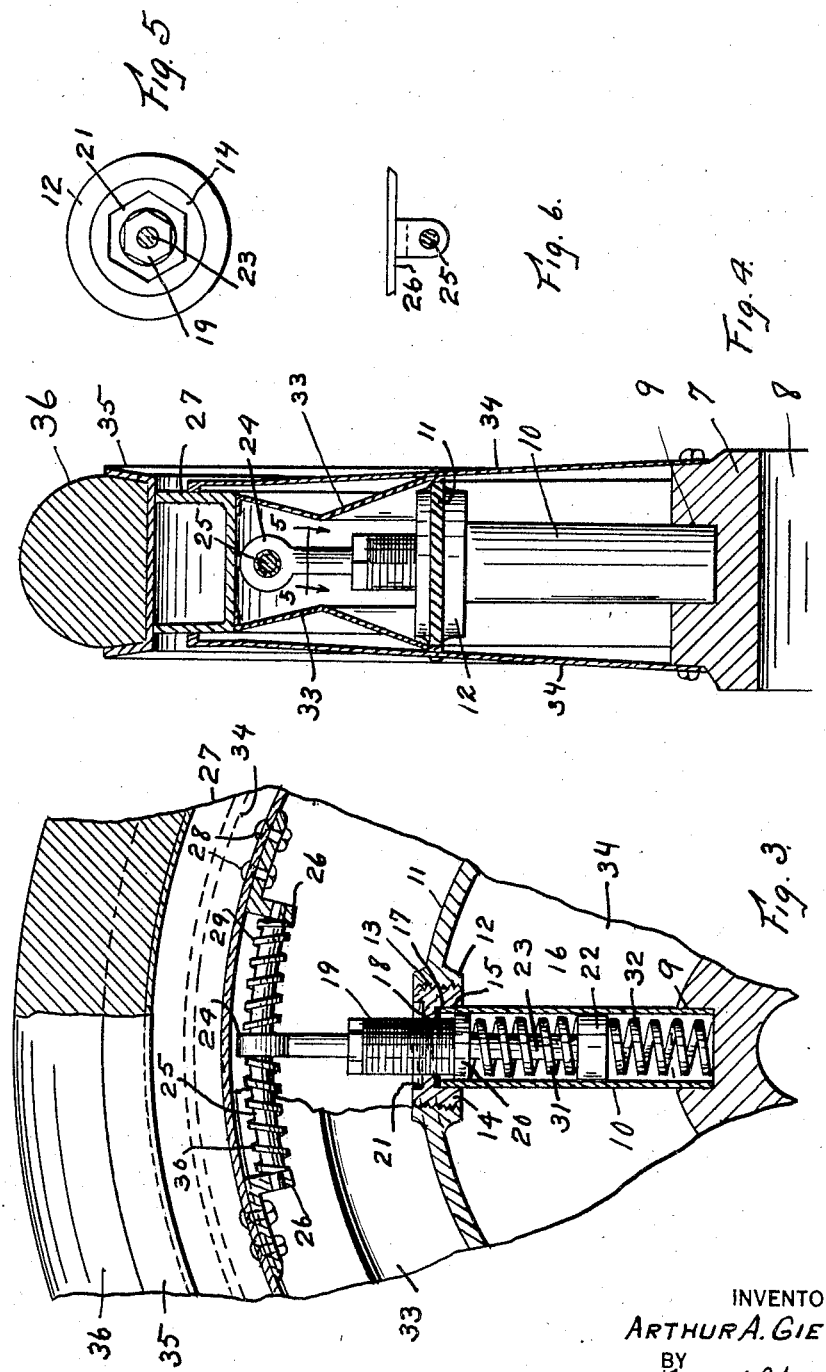

Patented Dec. 4, 1923.

1,476,200

UNITED STATES PATENT OFFICE.

ARTHUR A. GIETZELT, OF FRESNO, CALIFORNIA.

RESILIENT WHEEL.

Application filed January 17, 1922. Serial No. 529,943.

*To all whom it may concern:*

Be it known that I, ARTHUR A. GIETZELT, a citizen of Australia, and resident of Fresno, in the county of Fresno, State of California, have invented certain new and useful Improvements in Resilient Wheels, of which the following is a specification.

My invention relates to a wheel for motor vehicles and the like, and the object thereof is to provide a wheel of this character which will obviate the necessity for pneumatic tires.

A further object is to provide a wheel of the above character which will be simple in construction, effective in operation and in which the construction is such that breakage is reduced to the minimum and in which the parts may be easily and quickly replaced in case of wear or breakage.

Other objects and advantages will appear hereinafter and, while I have shown and will describe the preferred form of my invention, I wish it specifically understood that I do not limit myself to such preferred form of construction but that various changes and adaptations may be made therein without departing from the spirit of my invention.

In the drawings accompanying and forming a part of this application,

Fig. 3 is an enlarged fragmentary detail of a portion of my wheel sufficient to illustrate the construction thereof.

Fig. 4 is a vertical section through Fig. 3.

Fig. 5 is a section on the line 5—5 of Fig. 4.

Fig. 6 is a detail of a portion of my wheel.

Figure 1:
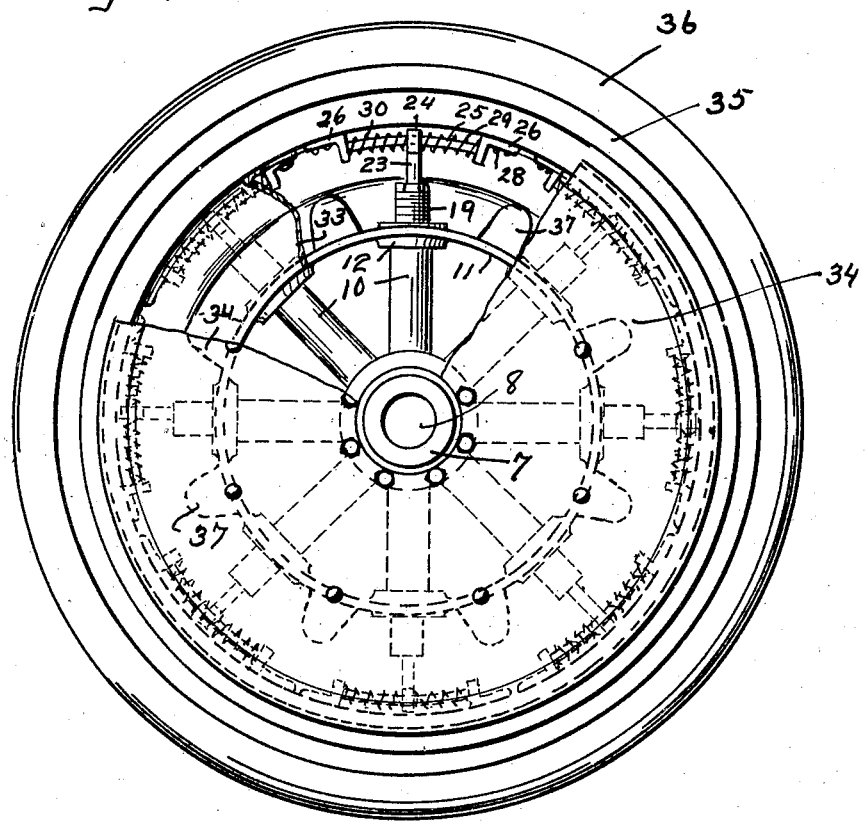
Fig. 1 is a side elevation, partly broken away, of a wheel, constructed according to my invention.
Figure 2:
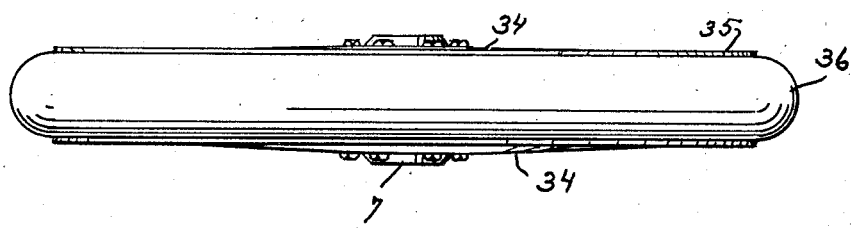
Fig. 2 is an edge view of Fig. 1.

Referring to the drawings my device comprises a hub 7 provided with the usual axle receiving hole 8. Provided in the outer periphery of hub 8 are a plurality of equally spaced annular sockets 9, in which are mounted the lower ends of the spring cylinder 10. Surrounding hub 10, concentric therewith, but spaced therefrom is an annular rim 11 provided with a plurality of equally spaced hubs 12, there being one hub for every recess 9 and said hubs are in radial alinement and concentric with said recesses 9. Provided in each of said hubs 12 is an aperture 13, which is screw threaded interiorally, and mounted on each of said recesses is a threaded member 14, in the lower end of which is provided a recess 15, adapted to receive the upper end of cylinder 10. A packing washer of felt, or any other suitable material, is mounted in said recess 15 and provides means to prevent leakage. Provided in member 14 is a concentric opening 18 in which is mounted an adjusting nut 19 in screw threaded engagement therewith, the lower end 20 of said nut being enlarged for a purpose hereafter explained, and the upper end being of a configuration to receive a wrench, whereby said nut may be rotated. A recess 21, hexagonal in shape, is provided in the upper face of member 14 to receive a wrench or other tool whereby the same may be rotated. Mounted in cylinder 10 is a piston 22 provided with a stem 23 which extends upwardly through member 19 and terminated in an eye 24. Eye 24 is slidably mounted upon a retaining rod 25, the ends of which rod are reduced and are mounted in brackets 26, detachably secured to the inner face of the felloe 27 by means of bolts 28. Coil springs 29 and 30 are mounted upon rod 25 between the eye 24 and bracket 26. Coiled around stem 23 between the upper face of piston 22 and the lower face of enlargement 20 is a coil spring 31. Mounted in cylinder 10 between lower end of piston 22 and recess 9 is a coil spring 32. Secured at its inner edge to the edge of member 11 and its outer edge to the lower face of felloe 27 is a flexible member 33, preferably of leather the purpose of which is to protect the working parts of my device from dust and the like, it being understood that there is one of these members at each side of said wheel. Mounted on hub 7 at each side thereof are discs 34 of metal, or the like, which are of a diameter sufficient to extend to the center of the sides of felloe 27 and are slidably engaged thereby. These discs may be omitted if desired. Mounted upon the upper edges of felloe 27 is the usual tire rim 35 on which is mounted a solid rubber tire 36. Secured to the outer periphery of rim 11 and extending upwardly therefrom are a plurality of spaced bumpers 37 of rubber or the like, the purpose of which is to prevent member 19 from striking rod 25 should the wheel be subjected to an excessive shock.

In the operation of my device the wheel will be mounted in the usual manner, the weight of the load being carried by the springs 31 and 32. Springs 29 and 30 are provided to take the circumferential thrust due to striking a rut or climbing a bump, or other obstruction in the road. In the event that spring 29 or 30 should break or need replacing one of the brackets 26 will be removed when rod 25 may be removed and the springs replaced. In the event that spring 31 or 32 should break or need replacement member 14 will be removed from the top when cylinder 10 can be moved upwardly and withdrawn from its position of use.

Having described my invention what I claim is:

1. A vehicle wheel comprising a hub; a felloe; a plurality of equally spaced, radially extending, cylinders mounted at one end in said hub; an annular rim mounted between said hub and felloe concentric therewith; a radially extending aperture in said rim for each of said cylinders; a holding member having an opening therethrough mounted in said aperture in screwthreaded engagement therewith; a recess in the inner face of each of said holding members adapted to receive the free end of one of said cylinders; an adjusting member adjustably mounted in the opening in said holding member and projecting into said cylinder; a piston slidably mounted in each of said cylinders to slide longitudinally thereof; a stem rigidly connected at one end to said piston having its other end extending through the opening in the adjusting member in slidable engagement therewith, terminating in an eye; a rod detachably mounted at its ends on the inner periphery of said felloe upon which said eye is slidably mounted; a resilient member mounted on said rod at each side of said eye and extending therefrom to each end of said rod; coil springs mounted within said cylinders at each side of said pistons; a pair of imperforate discs mounted one at each side of said hub and connected thereto, the free ends of said discs bearing against the side walls of said felloe in slidable engagement therewith; and a pair of flexible imperforate discs connected at their inner edges to the sides of said rims and at their outer edges to the sides of said felloe.

2. A vehicle wheel comprising a hub; a plurality of annular recesses formed in the outer periphery of said hub; a felloe; an annular rim mounted between said hub and felloe concentric therewith; a plurality of radially extending apertures in said rim, there being one of said apertures for each of said recesses; a holding member having an opening therethrough detachably mounted in each of said apertures; a recess in the inner face of each of said holding members surrounding the opening therethrough; an open ended cylinder rigidly mounted at one end in each of the recesses in said hub having its other end detachably mounted in the recess in said holding member; an adjusting member having a longitudinal opening therethrough adjustably mounted in the opening in said holding member and having its inner end enlarged to snugly fit the interior of the cylinders; a piston slidably mounted in each of said cylinders to slide longitudinally thereof; a stem rigidly connected at one end to said piston and having its other end extending radially through the opening in said adjusting member in slidable engagement therewith and terminating in an eye; a rod rigidly connected at its ends to the inner face of said felloe, upon which said eye is adapted to be slidably mounted; a spring coiled around said rod at each side of said eye and extending from said eye to each end of said rod; coil springs mounted within said cylinders at each side of said piston; a pair of imperforate discs mounted one at each side of said hub and secured thereto, the free ends of said discs bearing against the side walls of said felloe in slidable engagement therewith; a pair of flexible imperforate discs connected at their inner edges to the sides of said rim and at their outer edges to the sides of said felloe.

In witness that I claim the foregoing I have hereunto subscribed my name this 22 day of December, 1921.

ARTHUR A. GIETZELT.